United States Patent
Bostick et al.

(10) Patent No.: US 9,940,581 B2
(45) Date of Patent: Apr. 10, 2018

(54) ONTOLOGY-AIDED BUSINESS RULE EXTRACTION USING MACHINE LEARNING

(71) Applicant: International Business Machines Corporation, Armonk, NY (US)

(72) Inventors: James E. Bostick, Cedar Park, TX (US); John M. Ganci, Jr., Cary, NC (US); Paul E. Hensler, Somerset, NJ (US); Craig M. Trim, Sylmar, CA (US)

(73) Assignee: International Business Machines Corporation, Armonk, NY (US)

(*) Notice: Subject to any disclaimer, the term of this patent is extended or adjusted under 35 U.S.C. 154(b) by 701 days.

(21) Appl. No.: 14/084,964

(22) Filed: Nov. 20, 2013

(65) Prior Publication Data

US 2015/0142718 A1 May 21, 2015

(51) Int. Cl.
*G06F 17/00* (2006.01)
*G06N 5/02* (2006.01)

(52) U.S. Cl.
CPC .................... *G06N 5/025* (2013.01)

(58) Field of Classification Search
CPC ........ G06F 17/30289; G06F 17/30598; G06N 5/025
USPC .................................................... 706/15, 45
See application file for complete search history.

(56) References Cited

U.S. PATENT DOCUMENTS

| | | | |
|---|---|---|---|
| 6,389,588 B1 | 5/2002 | Wadhwa et al. |
| 6,847,981 B2 | 1/2005 | Song et al. |
| 7,672,957 B2 | 3/2010 | Cotichini et al. |
| 2005/0203942 A1 | 9/2005 | Sundararajan et al. |
| 2005/0235266 A1 | 10/2005 | Oara et al. |

OTHER PUBLICATIONS

Gleison S. do Nascimento, Cirano Iochpe, Lucinéia Thom, André C. Kalsing, and Álvaro Moreira, "Identifying Business Rules to Legacy Systems Reengineering Based on BPM and SOA", from B. Murgante et al. (Eds.): ICCSA 2012, Part IV, LNCS 7336, 2012, pp. 67-82.*

(Continued)

*Primary Examiner* — David Vincent
(74) *Attorney, Agent, or Firm* — Schmeiser, Olsen & Watts; William H. Hartwell

(57) ABSTRACT

An approach for distinguishing a business rule from a non-business rule in a computer program is provided. A rule in the program is identified based on a conditional statement within the rule. Whether the rule performs underlying operation of the program independent of a business function of the program is determined. The rule and metadata of the rule are searched for a key word which indicates part of a business transaction. Whether a sequence of program steps in the rule matches a predetermined sequence of program steps indicative of a business rule or whether the sequence of program steps in the rule matches a predetermined sequence of program steps indicative of underlying operation of the program independent of the business function of the program is determined. If the rule is a business rule is determined based on both determining steps and both searching steps.

16 Claims, 6 Drawing Sheets

(56) References Cited

OTHER PUBLICATIONS

Stlin Goedertier, "Declarative Techniques for Modeling and Mining Busines Processes", phd thesis published by Faculteit Economie En Bedrijfswetenschappen, Katholieke Universiteit Leuven, 2008, pp. 1-209.*

Gleison Samuel do Nascimento, Cirano Iochpe, Lucineia Heloisa Thom, Manfred Reichert, "A method for Rewriting Legacy Systems Using Business Process Management Technology", In Proceedings of the 11th International Conference on Enterprise Information Systems, Milan, Italy , 2009, pp. 57-62.*

* cited by examiner

US 9,940,581 B2

ONTOLOGY-AIDED BUSINESS RULE EXTRACTION USING MACHINE LEARNING

TECHNICAL FIELD

The present invention relates generally to extracting business rules, and more specifically to identifying business rules in program code.

BACKGROUND

Business rules encapsulate an application's business logic, making the application easier to understand, document, maintain, and test. If the application is in a legacy system and is being modernized, the business rules are extracted from the legacy system to ensure that the application's business logic is implemented in the modern system. Because the modern system will have its own way of performing system administration tasks, the rules for performing administration tasks in the legacy system do not need to be implemented in the modern system, and therefore the administration task rules in the legacy system do not need to be extracted. Known techniques in automated business rule extraction from a legacy code base start by querying the code base for specific code structures (e.g., an if-then statement and other code branching) and variables to identify a list of candidate business rules. Because the known business rule extraction approaches are high recall, low precision techniques, the resulting list is extremely inaccurate. A significant portion of the candidates on the list are not actual business rules (i.e., false positives). Some candidates on the list may be logging, exception handling, or some form of housecleaning, which are not actual business rules. Further work by human experts to eliminate those candidates on the list that are not actual business rules is a costly, time-consuming manual process.

U.S. Pat. No. 6,389,588 to Wadhwa et al. discloses an approach for extracting a business rule from a legacy application and transforming the extracted business rule into new code that is integrated into a new application. A user identifies business rules in the legacy application by determining a particular variable, data structure and/or "IF" statement is associated with business rules and using a graphical editor program to display portions of the legacy application in which the particular variable, data structure and/or "IF" statement is used. New code containing the business rule is generated for and integrated into the new application.

BRIEF SUMMARY

An embodiment of the present invention is a method, computer system and computer program product for distinguishing a business rule from a non-business rule in a computer program. A first rule in the computer program is identified based on a conditional statement within the first rule. Whether the first rule performs underlying operation of the program independent of a business function of the program is determined. The first rule is searched for a key word which indicates part of a business transaction with a customer of a business using the computer program. Metadata of the first rule is searched for a key word which indicates part of a business transaction with a customer of the business. Whether a sequence of program steps in the first rule matches a predetermined sequence of program steps indicative of a business rule or whether the sequence of program steps in the first rule matches a predetermined sequence of program steps indicative of underlying operation of the program independent of the business function of the program is determined. If the first rule is a business rule is determined based on both determining steps and both searching steps.

Embodiments of the present invention provide ontology and machine learning-based extraction of business rules to generate more accurate and precise lists of candidate business rules, which improve the sizing of a subsequent business rule extraction phase of an application modernization project. The more accurate lists do not include the significant number of candidate business rules that would have been generated by known business rule extraction techniques, thereby decreasing the number of candidate business rules that have to be examined by a human practitioner. By decreasing the number of candidate business rules, the cost of extracting and identifying actual business rules in an application modernization effort is reduced.

DETAILED DESCRIPTION

Overview

Embodiments of the present invention identify business rules (e.g., how many licensees are permitted to use a program, pricing, delivery date or payment terms for a product or service, return policy for a product or other aspects of a business transaction with a customer of the business) in program code using natural language processing (NLP)-based probabilistic modeling techniques and machine learning (ML) techniques, while filtering out non-business rules for the underlying operation of the program independent of the business function of the program (e.g., error checking, data validation, data logging, parameter cleanup, reserving memory, buffer setup, standard utilities, reports and system routines). In one embodiment, the probabilistic modeling techniques include Bayesian classification models to assign confidence levels to respective candidate business rules extracted from program code. Based on feedback from human practitioners who determine whether candidate business rules are actual business rules, ML techniques are applied to refine the confidence levels as the business rule identification process is used repeatedly over time to identify business rules extracted from code in multiple applications.

Figure 1:
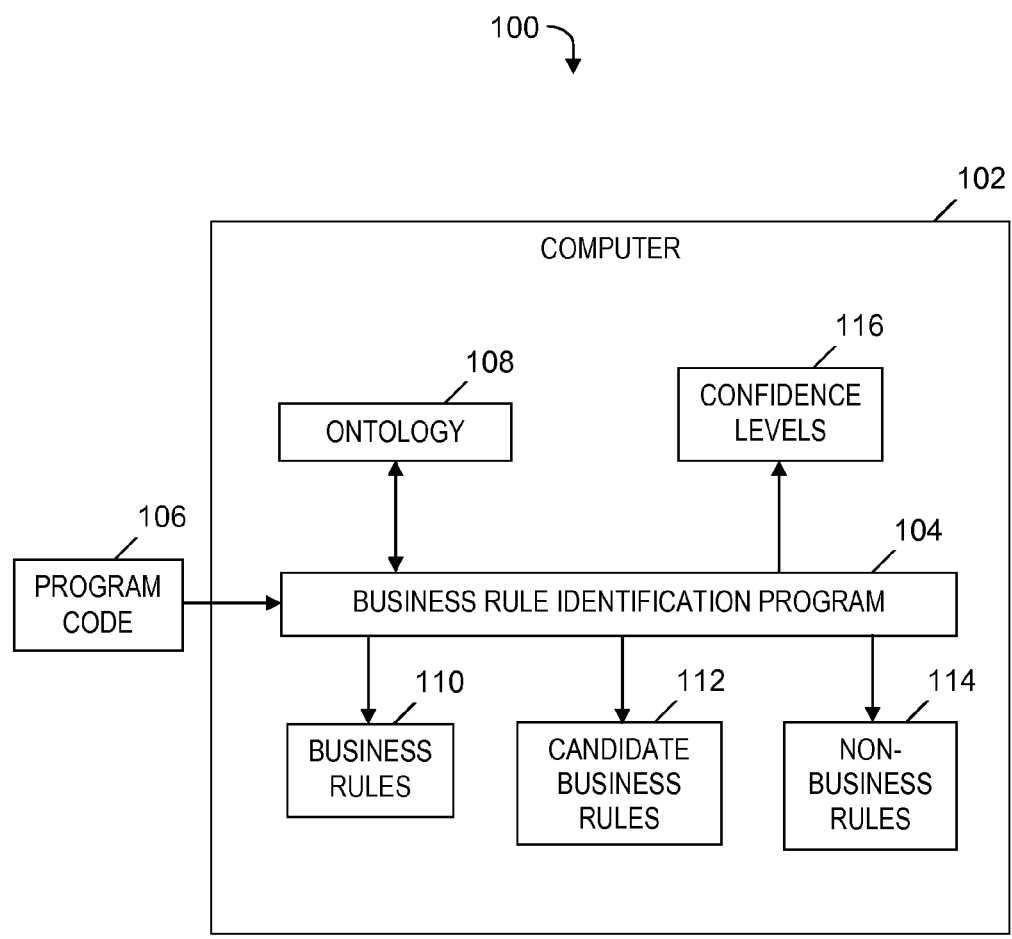
FIG. 1 is a block diagram of a system for distinguishing a business rule from a non-business rule in a computer program, in accordance with embodiments of the present invention.

System for Distinguishing a Business Rule from a Non-Business Rule in a Computer Program FIG. 1 is a block diagram of a system 100 for distinguishing a business rule from a non-business rule in a computer program, in accordance with embodiments of the present invention. System 100 includes a computer 102, which may include any type of computing system(s) including, for example, a personal computer, a mainframe computer, a server, etc. Computer 102 includes a central processing unit (CPU) (not shown), tangible data storage device(s) (not shown) and a memory (not shown). Computer 102 utilizes the CPU to execute a software-based business rule identification program 104 (i.e., computer program instructions) stored in the tangible storage device(s) via the memory to receive program code 106 in a programming language such as COBOL and to utilize an ontology 108 to identify business rules 110 (i.e., actual business rules), candidate business rules 112, and non-business rules 114 that are included in program code 104.

Each of the business rules 110 is a statement (e.g., conditional statement or "if" statement) in program code that imposes a constraint in the selection, relationship, and/or structure of data elements. Examples of business rules 110 include conditional statements that reference data elements whose names indicate the presence of a control of a business process and statements that perform business calculations that indicate business logic.

Each of non-business rules 114 is a statement in program code that does not impose a constraint in the selection, relationship, or structure of data elements, and that does not declare a policy or condition that must be satisfied within a business. Examples of non-business rules 110 include a conditional statement resulting in a call to an error checking routine, a conditional statement that uses data elements whose names indicate error checking usage, and one or more statements that include a housekeeping routine in a computer program.

Each of the candidate business rules 112 is a statement in program code that is tentatively classified as a business rule, and which may be later classified as an actual business rule or a non-business rule. Business rule identification program 104 generates and assigns confidence levels 116 to respective candidate business rules 112. Each of the confidence levels 116 is a number within a range of numbers (e.g., integers in a range of 0 to 100, inclusive) which indicates a likelihood that the respective candidate business rule is an actual business rule or an actual non-business rule. For example, a first candidate business rule having a confidence level of 20 is less likely to be an actual business rule than a second candidate business rule having a confidence level of 95, because the confidence level of 20 is less than the confidence level of 95.

Internal and external components of computer 102 are further described below relative to FIG. 6. The functionality of components of system 100 is further described below in the discussion relative to FIG. 2.

Figure 2:
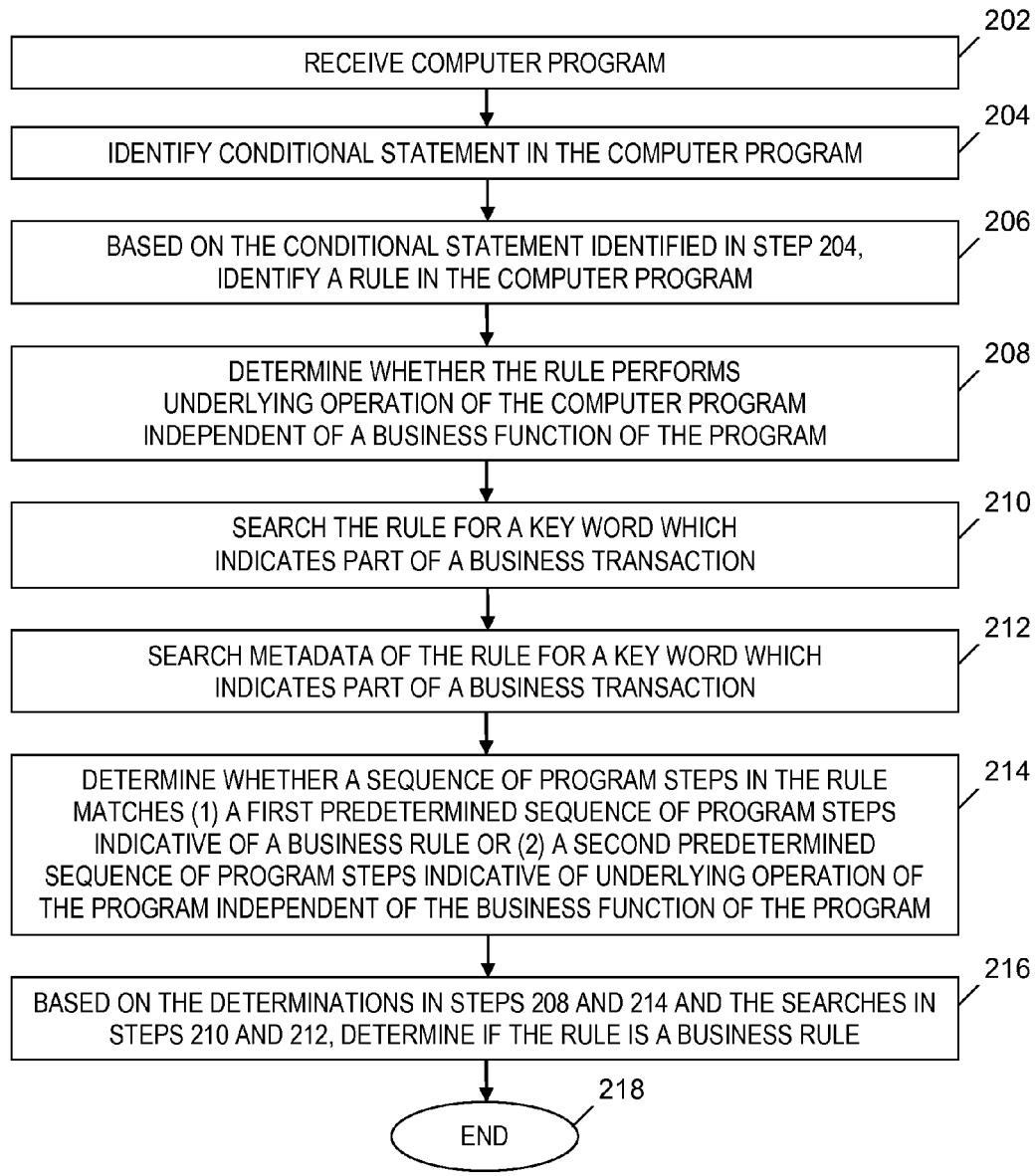
FIG. 2 is a flowchart of a business rule identification program executed in a computer included in the system of FIG. 1, in accordance with embodiments of the present invention.

FIG. 2 is a flowchart of business rule identification program 104 (see FIG. 1) executed in a computer system included in the system of FIG. 1, in accordance with embodiments of the present invention. In step 202, business rule identification program 104 (see FIG. 1) receives program code 106 (see FIG. 1) (i.e., a computer program).

In step 204, business rule identification program 104 (see FIG. 1) identifies a conditional statement in program code 106 (see FIG. 1).

In step 206, based on the conditional statement identified in step 204, business rule identification program 104 (see FIG. 1) identifies a rule in program code 106 (see FIG. 1). The rule identified in step 206 includes the conditional statement identified in step 204 and is initially included in candidate business rules 112 (see FIG. 1). A candidate business rule may be a business rule or a non-business rule but is not yet classifiable as a business rule or a non-business rule.

In step 208, business rule identification program 104 (see FIG. 1) determines whether the rule identified in step 206 performs underlying operation of program code 106 (see FIG. 1) independent of a business function of program code 106 (see FIG. 1). In one embodiment, the determination in step 208 includes searching the rule identified in step 206 for a key word which indicates the underlying operation of program code 106 (see FIG. 1) independent of a business function of program code 106 (see FIG. 1), such as ABEND, which indicates an error-checking routine has found a severe error, and STATUS-CODE, which is a name of a data element that indicates error checking. Other key words that indicate the underlying operation of program code 106 (see FIG. 1) independent of a business function of program code 106 (see FIG. 1) include words that indicate error checking, data validation, data logging, parameter cleanup, reserving memory, buffer setup, standard utilities, reports and system routines.

In step 210, business rule identification program 104 (see FIG. 1) searches the rule identified in step 206 for a key word which indicates part of a business transaction with a customer of a business which is using the program code 106 (see FIG. 1). An example of the key word searched for in step 206 is MAXLicensee which indicates how many licensees are permitted to use a program.

In step 212, business rule identification program 104 (see FIG. 1) searches metadata of the rule identified in step 206 for a key word which indicates part of a business transaction with a customer of the business which is using the program code 106 (see FIG. 1). In one embodiment, the metadata of the rule identified in step 206 includes one or more semantic tags assigned to the rule by SMEs. For example, the metadata of a rule may include the two key words "framework" and "exception" or the key word "JDBC connectivity."

In step 214, business rule identification program 104 (see FIG. 1) determines whether a sequence of program steps in the rule identified in step 206 matches (1) a first predetermined sequence of program steps indicative of a business rule, or (2) a second predetermined sequence of program steps indicative of underlying operation of the program code 106 (see FIG. 1) independent of the business function of the program code 106 (see FIG. 1).

Based on the determinations in steps 208 and 214 and the searches in steps 210 and 212, business rule identification program 104 (see FIG. 1) determines if the rule identified in step 206 is a business rule 110 (see FIG. 1) or a non-business rule 114 (see FIG. 1). The process of FIG. 2 ends at step 218.

As a first example, consider the following IF statement in a computer program:

```
IF SQLCODE > 0
    CALL SRABEND
END-IF
```

SRABEND is a routine that terminates a program abnormally (e.g., by calling ILBOABN0, the COBOL abend routine). Because business rule identification program 104 (see FIG. 1) finds the key word SRABEND in step 208, which indicates error checking that has found a severe error and which performs underlying operating of the computer program independent of a business function of the computer program (i.e., the IF statement matches the second predetermined sequence of program steps in step 214), business rule identification program 104 (see FIG. 1) identifies the IF statement as a non-business rule 114 (see FIG. 1) in step 216, and excludes the non-business rule from the set of candidate business rules 112 (see FIG. 1).

As a second example, consider the following IF statement in a computer program:

```
IF DB2-STATUS-CODE NOT EQUAL CALL-OK
    MOVE DB2-STATUS-CODE TO SAVE-STATUS
END-IF
```

In the second example presented above, DB2-STATUS-CODE is set after a call and CALL-OK indicates a successful call. Because business rule identification program 104 (see FIG. 1) finds the key word DB2-STATUS-CODE in step 208, which is a data element name that indicates error checking, which performs underlying operating of the computer program independent of a business function of the computer program (i.e., the IF statement matches the second predetermined sequence of program steps in step 214), business rule identification program 104 (see FIG. 1) identifies the IF statement as a non-business rule 114 (see FIG. 1) in step 216, and excludes the non-business rule from the set of candidate business rules 112 (see FIG. 1).

As a third example, consider the following IF statement in a computer program:

```
IF NUM-READ > MAX-CUST
    MOVE 'N' TO MORE-CUST-SW
END-IF
```

In the third example presented above, MAX-CUST is a business term indicating the maximum number of customers permitted. A comparison to MAX-CUST in the IF statement in the computer program indicates a presence of a business control. MORE-CUST-SW controls the reading of customer records. Because business rule identification program 104 (see FIG. 1) finds a comparison to the key word MAX-CUST, which indicates a business control (i.e., the IF statement matches the first predetermined sequence in step 214), business rule identification program 104 (see FIG. 1) identifies the IF statement as a business rule 110 (see FIG. 1) in step 216.

As a fourth example, consider the following IF statement in a computer program:

```
IF WS-CURR-DATE > SHED-SHIP-DT
    CALL 'UPDSCHDT' USING SHED-SHIP-DT
                          WS-DELAY
END-IF
```

In the fourth example presented above, subroutine UPDSCHDT recalculates the anticipated ShippingDate, WS-CURR-DATE is a work field holding the current business date, SCHED-SHIP-DT is the current ship date, and WS-DELAY indicates the number of days remaining to prepare the shipment. Because business rule identification program 104 (see FIG. 1) finds a call to UPDSCHDT in step 210 that triggers the use of business calculations that indicate business logic (i.e., the IF statement matches the first predetermined sequence in step 214), business rule identification program 104 (see FIG. 1) identifies the IF statement as a business rule 110 (see FIG. 1) in step 216.

Figure 3:
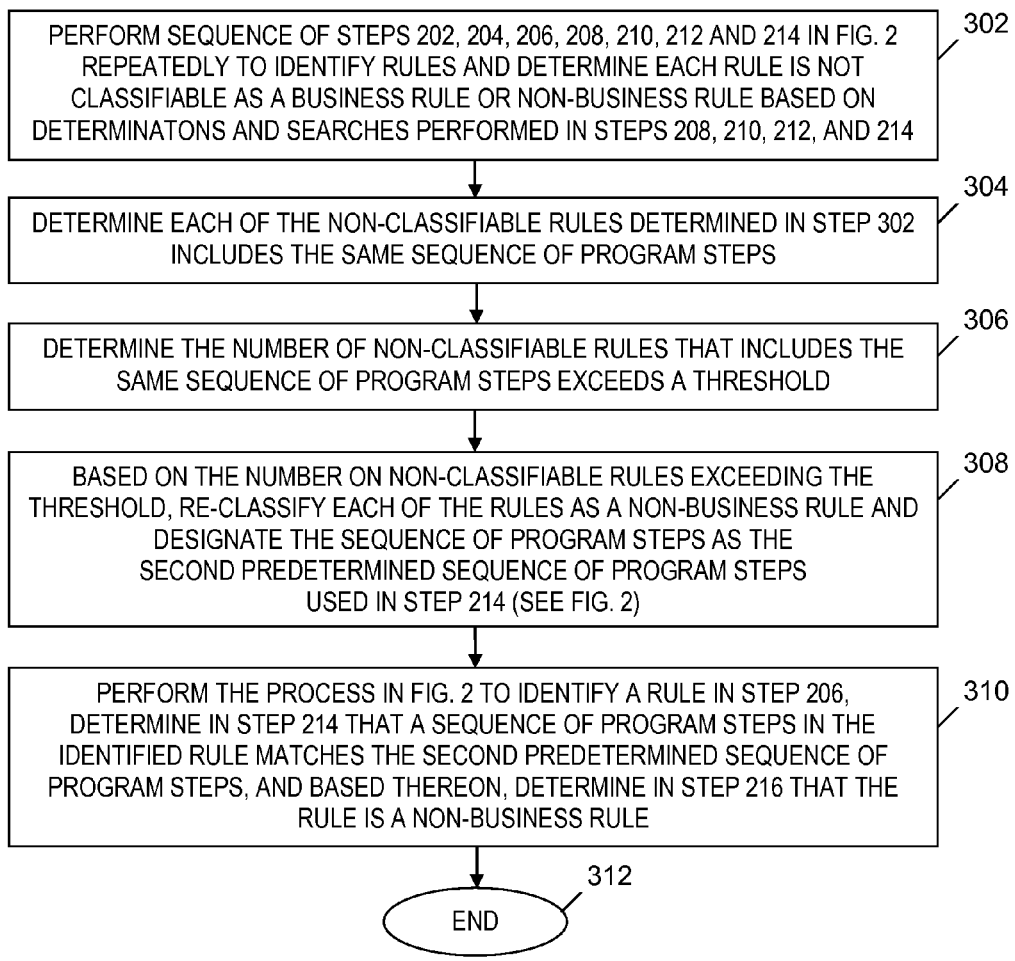
FIG. 3 is a flowchart of a business rule identification program executed in a computer included in the system of FIG. 1 to determine a rule is a non-business rule, in accordance with embodiments of the present invention.

FIG. 3 is a flowchart of business rule identification program 104 (see FIG. 1) executed in a computer included in the system of FIG. 1 to determine a rule is a non-business rule, in accordance with embodiments of the present invention. In step 302, business rule identification program 104 (see FIG. 1) repeatedly performs the sequence of steps 202, 204, 206, 208, 210, 212, and 214 (see FIG. 2) to identify rules in computer program(s) and determine each rule is not classifiable as a business rule or as a non-business rule based on the determinations and searches performed in steps 208, 210, 212 and 214 (see FIG. 2).

In step 304, business rule identification program 104 (see FIG. 1) determines each of the non-classifiable rules determined in step 302 includes the same sequence of program steps. In one embodiment, the sequence of program steps is in an identifiable portion of program code 106 (see FIG. 1). In one embodiment, the sequence of program steps is a paragraph in program code 106 (see FIG. 1).

In step 306, business rule identification program 104 (see FIG. 1) determines the number of non-classifiable rules that includes the same sequence of program steps exceeds a predetermined threshold. The business rule identification program 104 (see FIG. 1) receives the threshold from a user entry or from a stored default value prior to step 306.

In step 308, based on the number of non-classifiable rules exceeding the predetermined threshold, business rule identification program 104 (see FIG. 1) re-classifies each of the rules as a non-business rule, removes the re-classified rules from candidate business rules 112 (see FIG. 1), adds the re-classified non-business rules to non-business rules 114 (see FIG. 1), and designates the sequence of program steps as the second predetermined sequence of program steps, which is used in step 214 (see FIG. 2).

In step 310, business rule identification program 104 (see FIG. 1) performs the process of FIG. 2 to identify a rule in step 206 (see FIG. 2), determine in step 214 (see FIG. 2) that a sequence of program steps in the identified rule matches the second predetermined sequence of program steps indicative of underlying operating of the computer program independent of the business function of the program. Also in step 310, based on the sequence of program steps in the identified rule matching the second predetermined sequence of program steps, business rule identification program 104 (see FIG. 1) automatically determines in step 216 (see FIG. 2) that the rule identified in step 206 (see FIG. 2) is a non-business rule, without requiring a manual classification of the rule.

The process of FIG. 3 ends at step 312.

As one example, consider a rule that includes the following SET-CUST-SSA paragraph in a computer program:

```
SET-CUST-SSA
    ...
    IF INIT-CALL = 'Y'
        INITIALIZE SEARCH-ARGS
    END-IF
    ...
    CALL CBLTDLI USING ...
    IF SEG-STATUS = NRF
        MOVE 'NOT FOUND' TO RETURN-MSG
    END-IF
NEXT-PARAGRAPH-NAME
```

In the example presented above, paragraph SET-CUST-SSA sets up the control blocks for a call to read customer records, INIT-CALL is a flag indicating the need to initialize fields, and NRF is a value indicating No Record Found. Because the same paragraph SET-CUST-SSA, with the same statements, had been found in step 304 by business rule identification program 104 (see FIG. 1) in a number of non-classifiable rules which in step 306 is determined to exceed the threshold, business rule identification program 104 (see FIG. 1) has previously flagged the paragraph as likely being a housekeeping routine and probably not a business rule, and added the paragraph as a sequence of steps in a stored collection of predetermined sequences of steps indicative of underlying operation of a computer program independent of a business function of the computer program (i.e., designates the paragraph as the second predetermined sequence of program steps in step 308). By making the paragraph the aforementioned predetermined sequence of program steps, business rule identification program 104 (see FIG. 1) determines in step 214 (within step 310) that the paragraph is the predetermined sequence of program steps indicative of underlying operation of a computer program independent of a business function of the computer program. Based on the aforementioned determination in step 214 (within step 310), business rule identification program 104 (see FIG. 1) automatically determines in step 216 (within step 310) that all conditional statements within paragraph SET-CUST-SSA in this example do not include business logic and therefore identifies the conditional statements in SET-CUST-SSA as non-business rules 114 (see FIG. 1) in step 216 (within step 310), and excludes the non-business rules 114 (see FIG. 1) from the set of candidate business rules 112 (see FIG. 1).

Figure 4:
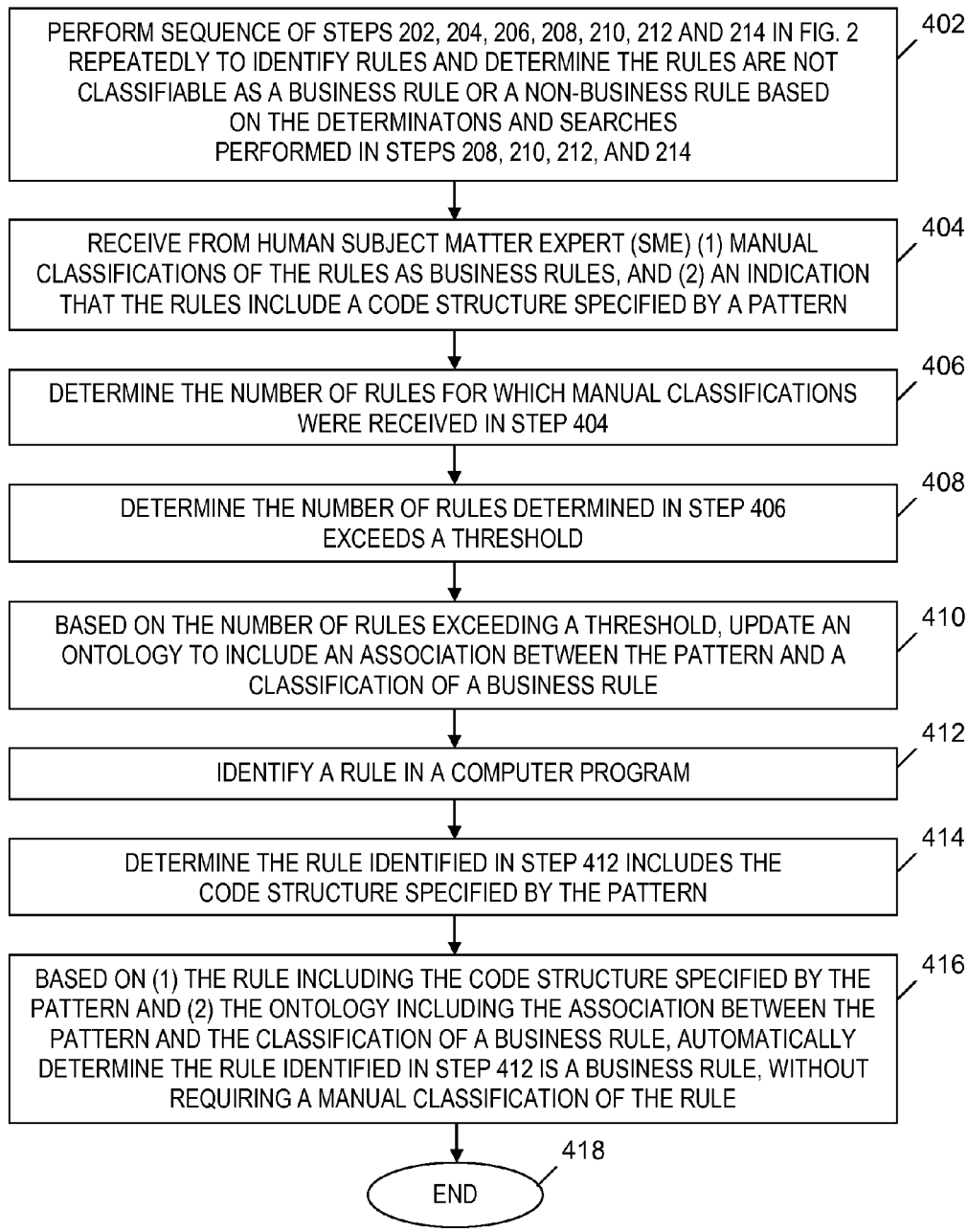
FIG. 4 is a flowchart of a business rule identification program executed in a computer included in the system of FIG. 1 to determine a rule is a business rule based on repeated previous manual classifications of the rule and the rule having a code structure specified by a pattern, in accordance with embodiments of the present invention.

FIG. 4 is a flowchart of a business rule identification program executed in a computer included in the system of FIG. 1 to determine a rule is a business rule based on repeated previous manual classifications of the rule and the rule having a code structure specified by a pattern, in accordance with embodiments of the present invention. In step 402, business rule identification program 104 (see FIG. 1) performs the sequence of steps 202, 204, 206, 208, 210, 212 and 214 in FIG. 2 repeatedly to identify rules and determine that each of the rules is not classifiable as a business rule or as a non-business rule based on the determinations and searches performed in steps 208, 210, 212 and 214.

In step 404, business rule identification program 104 (see FIG. 1) receives from human SME(s) (1) manual classifications of the rules as business rules, and (2) an indication that the rules include a code structure specified by a pattern. In one embodiment, the pattern that specifies the code structure included in each of the rules is a representation of the code structure expressed in a notation for a context-free grammar, such as Backus-Naur Form.

In one embodiment, in step 404, business rule identification program 104 (see FIG. 1) receives from the human SME(s) sets of one or more semantic tags that are applied to respective candidate business rules 112 (see FIG. 1) identified in step 402. Business rule identification program 104 (see FIG. 1) stores and maintains the sets of semantic tag(s) in ontology 108 (see FIG. 1), which is an ontology of defined classes. Ontology 108 (see FIG. 1) defines a set of semantic tag(s) that include higher-level concepts pertinent to all programming languages, and child concepts related to particular programming languages. Each class in ontology 108 (see FIG. 1) includes instance data, which is contained in a triple store (not shown) designed to aid in the parsing of program code 106 (see FIG. 1) for the data type specified by the class. In one embodiment, each class in ontology 108 (see FIG. 1) has the relationships presented below:

1. hasTokenName
2. hasCandidateRulePattern

The "hasCandidateRulePattern" relationship is expressed in Backus-Naur Form (BNF), a notation technique for context-free grammars. A context-free grammar for a given language can use a BNF snippet to identify patterns. Each class in ontology 108 (see FIG. 1) may have one or more "hasCandidateRulePattern" relationships.

There may be particular variations of the pattern in the BNF rule that yield better business rule identification results than other variations. Each variation is specified in a separate "hasCandidateRulePattern" triple. After each candidate business rule is extracted and sent to the human SME(s) prior to step 404, business rule identification program 104 (see FIG. 1) receives from the human SME(s) in step 404 an indication by semantic tagging as to the variation of the BNF rule that is associated with the candidate business rule. By this association between the variation of the BNF rule and the candidate business rule, the feedback from the human SME(s) aids system 100 (see FIG. 1) (1) in better placement of the candidate business rules 112 (see FIG. 1) within ontology 108 (see FIG. 1), and (2) in assigning more accurate confidence levels 116 (see FIG. 1) to future rules of the same type (i.e., aiding pattern conformance).

In one embodiment, step 404 also includes business rule identification program 104 (see FIG. 1) assigning confidence levels 116 (see FIG. 1) to reified forms of the candidate business rule patterns based on probabilistic modeling of semantic tags assigned to candidate business rules 112 (see FIG. 1). Business rule identification program 104 (see FIG. 1) maintains and modifies the reified forms in a triple store over time as the process of FIG. 4 is repeated. In one embodiment, business rule identification program 104 (see FIG. 1) employs Bayesian classification to assign a confidence level to each candidate business rule 112 (see FIG. 1). Over multiple iterations of the process of FIG. 4, business rule identification program 104 (see FIG. 1) modifies the confidence level 116 (see FIG. 1) assigned to reified forms of candidate business rule patterns, based on the feedback from the human SME(s) in repetitions of step 404 that indicates the effectiveness of the rules.

In step 406, business rule identification program 104 (see FIG. 1) determines the number rules for which manual classifications were received in step 404.

In step 408, business rule identification program 104 (see FIG. 1) determines the number of rules determined in step 406 exceeds a predetermined threshold. Business rule identification program 104 (see FIG. 1) receives the predetermined threshold prior to step 408 via a user entry or from a default value stored by system 100 (see FIG. 1).

In step 410, based on the number of rules determined in step 406 exceeding the predetermined threshold, business rule identification program 104 (see FIG. 1) updates ontology 108 (see FIG. 1) to include an association between the pattern and a classification of a business rule, where the pattern species the code structure included in each of the rules.

In step 412, business rule identification program 104 (see FIG. 1) identifies a rule in a computer program based on a conditional statement being included in the rule.

In step 414, business rule identification program 104 (see FIG. 1) determines the rule identified in step 412 includes the code structure specified by the pattern.

In step 416, based on (1) the rule including the code structure specified by the pattern, and (2) the ontology including the association between the pattern and the classification of a business rule, business rule identification program 104 (see FIG. 1) automatically determines the rule identified in step 412 is a business rule 110 (see FIG. 1), without requiring a manual classification of the rule.

Following step 416, the process of FIG. 4 ends at step 418.

In one embodiment, prior to step 416, business rule identification program 104 (see FIG. 1) initiates a display of one or more levels confidence of one or more of the candidate business rules 112 (see FIG. 1), where each level of confidence indicates a likelihood that the corresponding candidate business rule 112 (see FIG. 1) is a business rule.

Learning to Identify a Business Rule Based on a Confidence Level

In step 404, business rule identification program 104 (see FIG. 1) receives from human SME(s) a first set of semantic tag(s) (not shown) specifying the rules identified in step 402. The rules were identified in step 402 as candidate business rules 112 (see FIG. 1), which are not classifiable as business rules 110 (see FIG. 1) or as a non-business rules 114 (see FIG. 1). In one embodiment, business rule identification program 104 (see FIG. 1) stores the first set of semantic tag(s) as metadata of each of the rules identified in step 402.

Business rule identification program 104 (see FIG. 1) in step 404 (see FIG. 4) receives from the SME(s) manual classifications that the rules identified in step 402 are business rules 110 (see FIG. 1) and indications that each of the rules identified in step 402 includes a code structure specified by a pattern in a notation provided by a context-free grammar. In one embodiment, the context-free grammar is Backus-Naur Form. Business rule identification program 104 (see FIG. 1) stores the semantic tag(s) in a combination of classes and subclasses of ontology 108.

In step 404, business rule identification program 104 (see FIG. 1) determines a confidence level of each rule, where the confidence level indicates a confidence that the rule is a business rule. The confidence level is based on how many times in previous iterations of the process of FIG. 4 the business rule identification program 104 (see FIG. 1) receives (1) a manual classification of a rule included in the rules identified in step 402 as a business rule and (2) an indication that a rule included in the rules identified in step 402 includes the code structure specified by the pattern. The aforementioned number of times is equal to the number of rules determined in step 406. As the aforementioned number of times determined in step 406 increases, the confidence level increases to indicate that it is more likely that the rule is a business rule.

In an alternate to step 408, business rule identification program 104 (see FIG. 1) determines the confidence level of each rule is less than a first threshold value, where business rule identification program 104 (see FIG. 1) receives the first threshold value prior to the alternate to step 408. Based on the confidence level being less than the first threshold value, business rule identification program 104 (see FIG. 1) determines a lack of confidence in automatically determining a subsequently identified rule having the code structure is a business rule 110 (see FIG. 1).

Through repetitions of the sequence of steps 402, 404, and 406, business rule identification program 104 (see FIG. 1) identifies other candidate business rules in step 402, receives from the SME(s) in step 404 other sets of sematic tag(s) specifying other candidate business rules included in candidate business rules 112 (see FIG. 1). Business rule identification program 104 (see FIG. 1) determines in step 404 that the other sets of semantic tag(s) are identical to the first set of semantic tag(s).

Business rule identification program 104 (see FIG. 1) determines in step 404 that the other candidate business rules include the code structure specified by the aforementioned pattern.

Business rule identification program 104 (see FIG. 1) determines in step 406 the aforementioned number of times the business rule identification program 104 (see FIG. 1) receives (1) a manual classification of a rule included in the rules identified in step 402 as a business rule and (2) an indication that a rule included in the rules identified in step 402 includes the code structure specified by the pattern.

Business rule identification program 104 (see FIG. 1) in the alternate to step 408 increases the confidence level of the candidate business rules 112 (see FIG. 1) to indicate that the likelihood that the candidate rules are business rules 110 (see FIG. 1) has increased. In the alternate to step 408, business rule identification program 104 (see FIG. 1) determines the increased confidence level exceeds the first threshold value.

In an alternate to step 410, based on the first threshold value being exceeded, business rule identification program 104 (see FIG. 1) updates ontology 108 (see FIG. 1) to associate the pattern with the increased confidence level, where previously the ontology associated the pattern with the lower confidence level.

Subsequent to determining the increased confidence level exceeds the first threshold value, business rule identification program 104 (see FIG. 1) identifies a second rule as a candidate business rule in step 412, and determines the second rule includes the code structure specified by the pattern in step 414. In an alternate to step 416, based on the second rule including the code structure specified by the pattern, and based on ontology 108 (see FIG. 1) including an association between the pattern and the increased confidence level that exceeds the first threshold value, business rule identification program 104 (see FIG. 1) automatically determines the second rule is a business rule 110 (see FIG. 1), without requiring a manual classification of the second rule.

Alternately, business rule identification program 104 (see FIG. 1) determines that a set of semantic tag(s) specifies the aforementioned second rule, where the set of semantic tag(s) matches the first set of semantic tag(s). Based on the second rule including the code structure specified by the pattern, the second rule being specified by the first set of semantic tag(s), and ontology 108 (see FIG. 1) including an association between the increased confidence level and a combination of the pattern and the first set of semantic tag(s), business rule identification program 104 (see FIG. 1) automatically determines the second rule is a business rule 110 (see FIG. 1), without requiring a manual classification of the second rule.

Decreasing Candidate Rules

Figure 5:
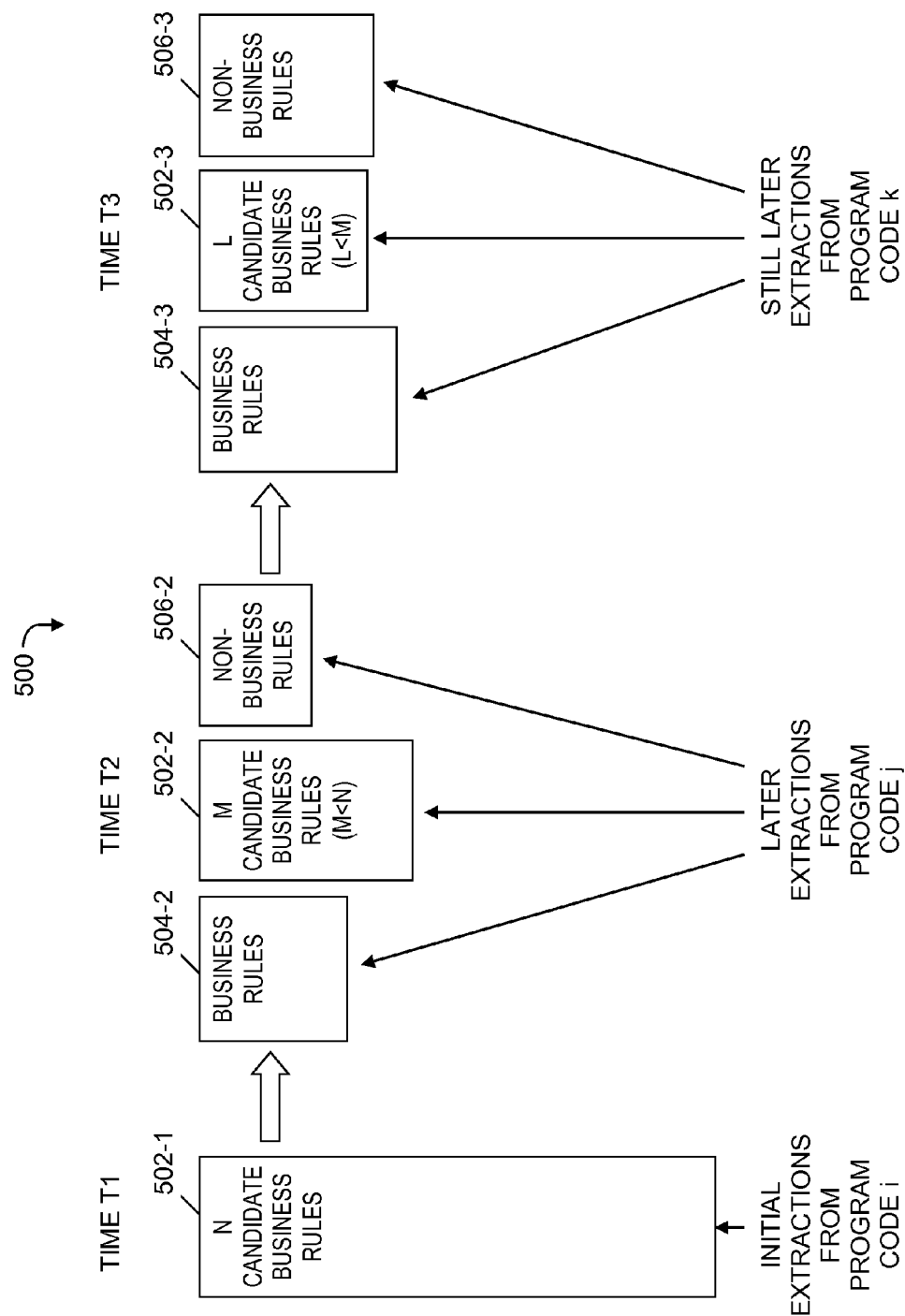
FIG. 5 depicts an example of a number of identified candidate business rules being decreased as the business rule identification program in the system of FIG. 1 is executed repeatedly, in accordance with embodiments of the present invention.

FIG. 5 depicts an example of a number of identified candidate business rules being decreased as the business rule identification program in the system of FIG. 1 is executed repeatedly, in accordance with embodiments of the present invention.

An example 500 depicts results of different iterations of the process of FIG. 4 over time. At time T1, business rule identification program 104 (see FIG. 1) initially extracts N statements from program code i and identifies all of the initially extracted statements as respective N candidate business rules 502-1 and assigns each of the N candidate business rules 502-1 with a default initial confidence level of 50.

Between time T1 and time T2, there are one or more iterations of the process of FIG. 4, which processes set(s) of program code, thereby updating ontology 108 (see FIG. 1) in iterations of step 410 (see FIG. 4) so that business rule identification program 104 (see FIG. 1) is trained to recognize a first set of patterns in statements extracted from program code. Because of the training that occurred between time T1 and time T2, business rule identification program 104 (see FIG. 1) is able to assign various confidence levels to extracted statements. For this example, a first threshold value for determining an actual business rule is 80 and a second threshold value for determining an actual non-business rule is 20. Therefore, if a statement is assigned a confidence level above 80, then business rule identification program 104 (see FIG. 1) classifies the statement as an actual business rule. If a statement is assigned a confidence level below 20, then business rule identification program 104 (see FIG. 1) classifies the statement as an actual non-business rule. If a statement has a confidence level in the closed interval 20 to 80, then business rule identification program 104 (see FIG. 1) determines that the statement cannot be classified as an actual business rule or an actual non-business rule, and therefore classifies the statement as a candidate business rule 112 (see FIG. 1).

After the aforementioned one or more iterations, business rule identification program 104 (see FIG. 1) performs later extractions of N statements from program code j in a subsequent iteration of the process of FIG. 4. Using the first set of patterns, business rule identification program 104 (see FIG. 1) assigns confidence levels to the statements. Based on the assigned confidence levels, business rule identification program 104 (see FIG. 1) identifies actual business rules 504-2, actual non-business rules 506-2, and M candidate business rules 502-2 in the statements extracted from program code j, where M<N. Business rules 504-2, candidate business rules 502-2, and non-business rules 506-2 are shown in FIG. 5 at time T2, which is after time T1 and after the later extractions from program code j.

Between time T2 and time T3, there are one or more additional iterations of the process of FIG. 4, which processes set(s) of program code, thereby further updating ontology 108 (see FIG. 1) in further iterations of step 410 (see FIG. 4) so that business rule identification program 104 (see FIG. 1) is further trained to recognize a second set of patterns in statements extracted from program code, where the second sets are larger than the respective first sets described above.

After the aforementioned one or more additional iterations, business rule identification program 104 (see FIG. 1) performs still later extractions of N statements from program code k in a subsequent iteration of the process of FIG. 4. Using the second set of patterns, business rule identification program 104 (see FIG. 1) assigns confidence levels to the statements and identifies actual business rules 504-3, actual non-business rules 506-3, and L candidate business rules 502-3 in the statements extracted from program code k, where L<M. Business rules 504-3, candidate business rules 502-3, and non-business rules 506-3 are shown in FIG. 5 at time T3, which is after time T2 and after the still later extractions from program code k.

Because of the machine learning that has occurred between time T1 and time T3 by the multiple iterations of the process of FIG. 4, the same number of extractions results in fewer candidate business rules over time. Over time, there are more extracted statements that are immediately and automatically classified as actual business rules or actual non-business rules, thereby leaving a decreased number of candidate business rules. A fewer number of candidate business rules means that the amount of human effort and cost needed is advantageously decreased. That is, over time, there are fewer manual classifications needed in step 404 (see FIG. 4) because there are fewer statements being classified as candidate business rules (i.e., there are more statements whose confidence levels exceed a first threshold so that they are automatically classified as business rules, and more of other statements whose confidence levels are less than a second threshold so that they are automatically classified as non-business rules).

Examples of Classification of Candidate Business Rules

In step 404 (see FIG. 4), business rule identification program 104 (see FIG. 1) receives from the human SME(s) sets of one or more semantic tags that are applied to respective candidate business rules 112 (see FIG. 1). Examples of semantic tags that may be included in a set of semantic tag(s) include "exception," "framework," "JDBC connectivity," or "business rule." A tag such as the "business rule" tag indicates that the human expert identifies the respective candidate business rule as an actual business rule. JDBC stands for Java Database Connectivity, a data access technology offered by Oracle Corporation located in Redwood City, Calif. Java is a registered trademark of Oracle Corporation.

Ontology 108 (see FIG. 1) defines a set of semantic tag(s) that include higher-level concepts pertinent to all programming languages, and child concepts related to particular programming languages, as shown in the following example:

```
Connectivity
    DatabaseConnectivity
        JdbcConnectivity
        ImsConnectivity
    NetworkConnectivity
Call
    DatabaseCall
        JdbcCall
    MethodCall
    ModuleCall
    ClassCall
ErrorHandling
    JavaExceptionHandling
    CobolErrorHandling
...
```

The relationships (i.e., hasTokenName and hasCandidateRulePattern) of each class in ontology 108 (see FIG. 1) are illustrated in the example presented below in N3 triple syntax:

```
ModuleCall
    rdf:type COBOL ;
    hasTokenName "CALL"^^xsd:string ;
    hasCandidateRulePattern "<CALL>(Identifier | Literal)
    (<USING> ( ( ( (<BY>)? <REFERENCE>)?"
```

Again, the "hasCandidateRulePattern" relationship is expressed in Backus-Naur Form (BNF), a notation technique for context-free grammars. A context-free grammar for a given language can use a BNF snippet to find patterns.

As an example of a class in ontology 108 (see FIG. 1) having one or more "hasCandidateRulePattern" relationships, consider a CALL extraction from COBOL code, where multiple CALL patterns need to be considered. All of the CALL patterns in this example can be expressed in a single BNF rule, as presented below:

```
CallStatement ::=
    <CALL> (Identifier | Literal) (<USING> ( ( ( ( <BY> )?
    <REFERENCE> )? ( ( Identifier | <ADDRESS> <OF>
    Identifier | FileName ) )+ | ( <BY> )? <CONTENT>
    ( ( ( <LENGTH> <OF> )? Identifier | <ADDRESS> <OF>
    Identifier | Literal ) )+ ) )+ )? ( ( <ON> )?
    <OVERFLOW> StatementList )? ( ( <ON> )? <EXCEPTION>
    StatementList )? ( <NOT> (<ON> )? <EXCEPTION>
    StatementList )? ( <END_CALL> )?
```

As an example of business rule identification program 104 (see FIG. 1) assigning confidence levels 116 (see FIG. 1) to reified forms of the candidate business rule patterns, consider:

```
(?candidateRule hasCandidateRulePattern ?rulePattern)
hasConfidenceLevel
?confidenceLevel
```

Actual values may be placed where the ?variable format is used in the previous example. With actual values replacing the ?variable format, the previous example may be:

```
(ModuleCall hasCandidateRulePattern "<CALL> ( Identifier | Literal )")
hasConfidenceLevel 50 ^^ xsd:double
```

As the process of FIG. 4 is repeated over time, business rule identification program 104 (see FIG. 1) modifies the confidence level 116 (see FIG. 1) assigned to the reified form shown in the preceding example, based on feedback from the human SME(s) in step 404 that indicates the effectiveness of the rule.

Computer System

Figure 6:
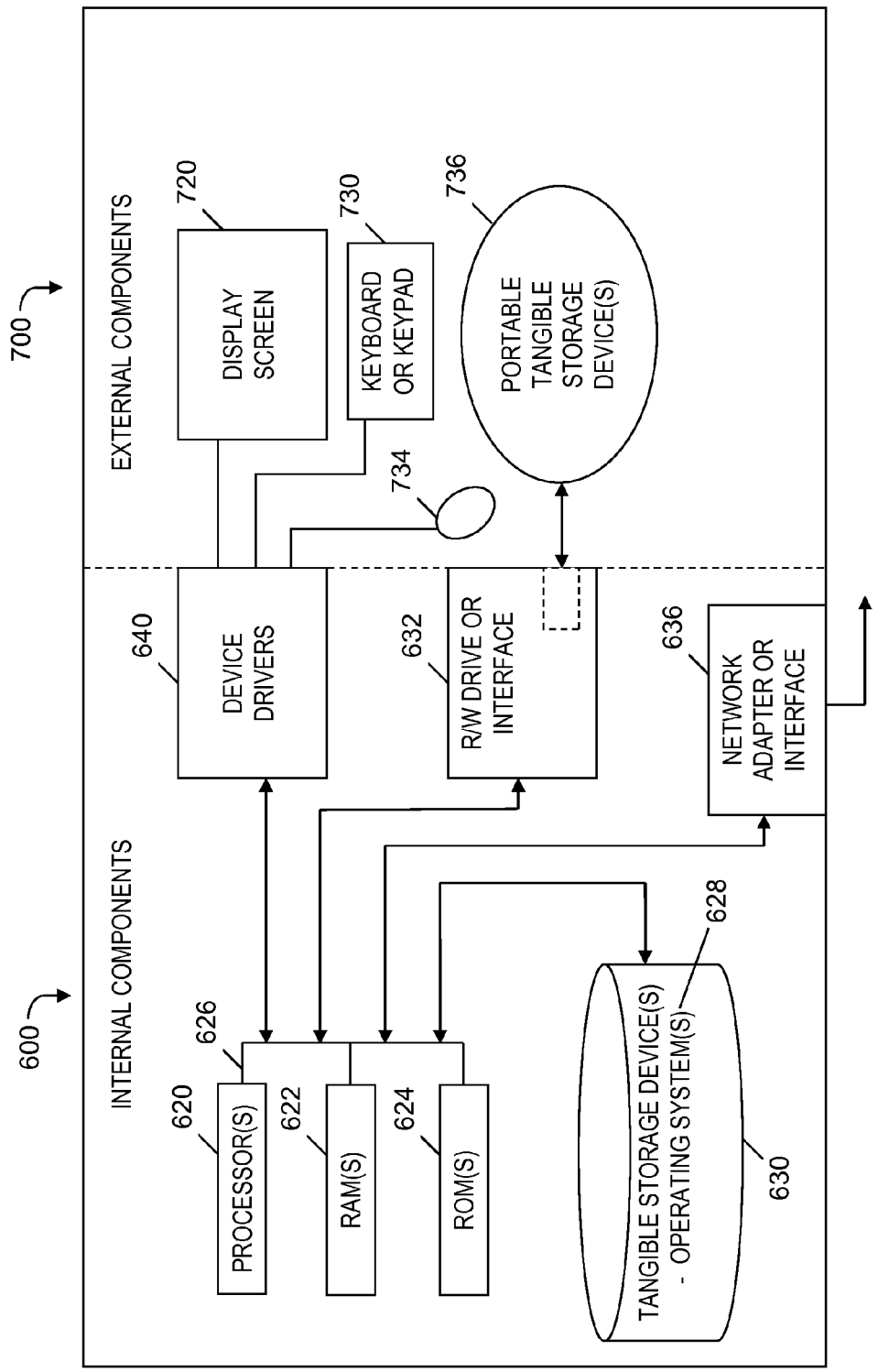
FIG. 6 is a block diagram of a computer included in the system of FIG. 1 for distinguishing a business rule from a non-business rule in a computer program, in accordance with embodiments of the present invention.

FIG. 6 is a block diagram of components of computer 102 (see FIG. 1), which is included in the system of FIG. 1 for distinguishing a business rule from a non-business rule in a computer program, in accordance with embodiments of the present invention. Computer 102 (see FIG. 1) includes sets of internal components 600 and external components 700 illustrated in FIG. 6. The set of internal components 600 includes one or more processors 620, one or more computer-readable random access memories (RAMs) 622 and one or more computer-readable read-only memories (ROMs) 624 on one or more buses 626, one or more operating systems 628 and one or more computer-readable storage devices 630. The one or more operating systems 628 and program instructions 104 (for computer 102 in FIG. 1) are stored on one or more of the respective computer-readable storage devices 630 for execution by one or more of the respective processors 620 via one or more of the respective RAMs 622 (which typically include cache memory). In the illustrated embodiment, each of the computer-readable storage devices 630 is a magnetic disk storage device of an internal hard drive. Alternatively, each of the computer-readable storage devices 630 is a semiconductor storage device such as ROM 624, erasable programmable read-only memory (EPROM), flash memory or any other computer-readable storage device that can store and retain but does not transmit a computer program and digital information.

The set of internal components 600 also includes a read/write (R/W) drive or interface 632 to read from and write to one or more portable tangible computer-readable storage devices 736 that can store but do not transmit a computer program, such as a CD-ROM, DVD, memory stick, magnetic tape, magnetic disk, optical disk or semiconductor storage device. The program instructions 104 (for computer 102 in FIG. 1) can be stored on one or more of the respective portable tangible computer-readable storage devices 736, read via the respective R/W drive or interface 632 and loaded into the respective hard drive or semiconductor storage device 630. The terms "computer-readable storage device" and "computer-readable storage devices" do not encompass signal propagation media such as copper transmission cables, optical transmission fibers and wireless transmission media.

The set of internal components 600 also includes a network adapter or interface 636 such as a transmission control protocol/Internet protocol (TCP/IP) adapter card or wireless communication adapter (such as a 4G wireless communication adapter using orthogonal frequency-division multiple access (OFDMA) technology). The program 104 (for computer 102 in FIG. 1) can be downloaded to computer 102 (see FIG. 1) from an external computer or external computer-readable storage device via a network (for example, the Internet, a local area network or other, wide area network or wireless network) and network adapter or interface 636. From the network adapter or interface 636, the program 104 (see FIG. 1) is loaded into the respective hard drive or semiconductor storage device 630. The network may comprise copper transmission cables, optical transmission fibers, wireless transmission, routers, firewalls, switches, gateway computers and/or edge servers.

The set of external components 700 includes a display screen 720, a keyboard or keypad 730, and a computer mouse or touchpad 734. The set of internal components 600 also includes device drivers 640 to interface to display screen 720 for imaging, to keyboard or keypad 730, to computer mouse or touchpad 734, and/or to the display screen for pressure sensing of alphanumeric character entry and user selections. The device drivers 640, R/W drive or interface 632 and network adapter or interface 636 comprise hardware and software (stored in storage device 630 and/or ROM 624).

The program 104 (see FIG. 1) can be written in various programming languages (such as C++) including low-level, high-level, object-oriented or non-object-oriented languages. Alternatively, the functions of program 104 (see FIG. 1) can be implemented in whole or in part by computer circuits and other hardware (not shown).

Based on the foregoing, a computer system, method and program product have been disclosed for determining whether a candidate business rule is a business rule. However, numerous modifications and substitutions can be made without deviating from the scope of the present invention. Therefore, the present invention has been disclosed by way of example and not limitation.

What is claimed is:

1. A method of distinguishing a business rule from a non-business rule in a computer program, the method comprising the steps of:
   a computer identifying a first rule in the computer program based on a conditional statement within the first rule;
   the computer determining whether the first rule performs an underlying operation of the program, the underlying operating being independent of a business function of the program, by determining whether the first rule includes a first key word which indicates the underlying operation, which is a housekeeping process, exception handling, error checking, data validation, parameter cleanup, a reservation of computer memory, or a buffer setup;

the computer determining whether a sequence of program steps in the first rule matches a predetermined sequence of program steps indicative of the underlying operation of the program independent of the business function of the program;

if the first rule includes the first key word or the sequence of program steps in the first rule matches the predetermined sequence of steps indicative of the underlying operation of the program independent of the business function of the program, the computer determining the first rule is a non-business rule, or if the first rule does not include the first key word and no sequence of program steps in the first rule matches the predetermined sequence of program steps indicative of the underlying operation of the program independent of the business function of the program, the computer:

searching the first rule and metadata of the first rule for a second key word which indicates part of a business transaction with a customer of a business using the computer program;

determining whether a sequence of program steps in the first rule matches a predetermined sequence of program steps indicative of a business rule; and if the first rule includes the second key word, the metadata of the first rule includes the second key word, or the sequence of program steps in the first rule matches the predetermined sequence of program steps indicative of the business rule, determining the first rule is the business rule, or if the first rule and the metadata of the first rule do not include the second key word and no sequence of program steps in the first rule matches the predetermined sequence of program steps indicative of the business rule, determining the first rule is not classifiable as the business rule or the non-business rule;

the computer receiving a first set of one or more semantic tags specifying a first candidate business rule in the computer program, the first candidate business rule being initially not classifiable as a first actual business rule or a first actual non-business rule;

based on the first set of one or more semantic tags, the computer determining the first candidate business rule is specified by a pattern expressed in a context-free grammar for a programming language of the computer program, the pattern specifying a code structure included in the first candidate business rule, the pattern being included in a class of an ontology, and the class identifying a concept of the programming language;

the computer determining that a confidence level of the pattern is less than a first threshold, the confidence level indicating how likely the first candidate business rule is the first actual business rule, and the ontology associating the pattern with the confidence level;

based on the confidence level being less than the first threshold, the computer determining a lack of confidence in the first candidate business rule being the first actual business rule;

the computer receiving other sets of one or more semantic tags specifying other candidate business rules, each of the other sets of one or more semantic tags being identical to the first set of one or more semantic tags, and each of the other candidate business rules being not classifiable as an actual business rule or an actual non-business rule;

based on the other sets of one or more semantic tags being identical to the first set of one or more semantic tags, the computer determining the other candidate business rules are specified by the pattern that also specifies the first candidate business rule;

based on the other candidate business rules being specified by the pattern that also specifies the first candidate business rule, the computer determining that the other candidate business rules include the code structure specified by the pattern;

the computer determining a count of candidate business rules among the first candidate business rule and the other candidate business rules that include the code structure specified by the pattern;

the computer determining that the count of the candidate business rules exceeds a second threshold;

based on the count of the candidate business rules exceeding the second threshold, the computer increasing the confidence level of the pattern which indicates an increase in a likelihood that the candidate business rules are actual business rules;

the computer updating the ontology to associate the pattern with the increased confidence level;

the computer determining the increased confidence level of the pattern is greater than the first threshold;

subsequent to the step of determining the increased confidence level is greater than the first threshold, the computer receiving a second set of one or more semantic tags specifying a second candidate business rule in the computer program or in another computer program;

the computer determining that the second candidate business rule includes the code structure specified by the pattern and determining that the second set of one or more semantic tags matches the first set of one or more semantic tags; and based on the second candidate business rule including the code structure specified by the pattern, the second set of one or more semantic tags matching the first set of one or more semantic tags, and the updated ontology associating the pattern with the increased confidence level, the computer automatically determining that the second candidate business rule is a second actual business rule, without a manual classification of the second candidate business rule as the second actual business rule by a human expert; and the computer displaying the second candidate business rule as the second actual business rule.

2. The method of claim 1, further comprising the steps of:

subsequent to a performance of the step of determining the first rule is not classifiable as the business rule or the non-business rule, the computer receiving a manual classification of the first rule as the business rule, the manual classification including a set of semantic tags specifying the first rule is the business rule, wherein the step of determining if the first rule is the business rule is based in part on the set of semantic tags;

the computer receiving manual classifications of other rules in the computer program or in other computer program(s) as the business rule, the manual classifications including the set of semantic tags specifying each of the other rules is the business rule;

the computer determining a count of the received manual classification plus the received manual classifications exceeds a predetermined threshold;

based on the count exceeding the threshold and the set of semantic tags specifying the first rule is the business rule and each of the one or more other rules is the business rule, the computer updating an ontology to include an association between the set of semantic tags and the business rule;

subsequent to the step of updating the ontology, the computer identifying a second rule in the computer program or in another computer program based on a conditional statement within the second rule;

the computer determining the set of semantic tags included in the ontology specifies the second rule; and based on (1) the ontology including the association between the set of semantic tags and the business rule and (2) the set of semantic tags specifying the second rule, the computer automatically determining the second rule is the business rule.

3. The method of claim 1, further comprising the steps of:

for each time a sequence of program steps included in a second rule occurs in multiple computer programs, the computer determining the sequence of program steps included in the second rule includes a conditional statement but does not match a predetermined sequence of program steps indicative of the business rule, does not match a predetermined sequence of program steps indicative of an underlying operation of a program included in the multiple programs independent of a business function of the program included in the multiple programs, does not include a key word indicative of the business rule, and does not include a key word indicative of the underlying operation of the program included in the multiple programs independent of the business function of the program included in the multiple programs;

the computer determining a number of times the sequence of program steps in the second rule occurs in the multiple computer programs and determining the number exceeds a predetermined threshold;

based on the number exceeding the threshold, the computer changing a classification of the second rule from being unclassifiable as the business rule or as a rule that is not any business rule to being classified as the rule that is not any business rule;

subsequent to the step of changing the classification, the computer identifying the second rule in another computer program; and based on the changed classification, the computer automatically determining the identified second rule is the rule that is not any business rule.

4. The method of claim 1, further comprising the steps of:

for multiple occurrences of a second rule in the computer program, the computer determining the second rule includes a conditional statement but does not match a predetermined sequence of program steps indicative of the business rule, does not match a predetermined sequence of program steps indicative of the underlying operation of the program independent of the business function of the program, does not include a key word indicative of the business rule, and does not include a key word indicative of the underlying operation of the program independent of the business function of the program;

for each of the multiple occurrences, the computer sending the second rule to one or more human experts;

the computer receiving classifications from the one or more human experts of the second rule as the business rule;

the computer determining a count of how many occurrences are included in the multiple occurrences and determining the count exceeds a predetermined threshold;

based on the count exceeding the threshold, the computer updating an ontology by storing an association between the business rule and one or more key words included in the second rule or in metadata of the second rule;

the computer identifying another rule that includes the one or more key words or whose metadata includes the one or more key words; and based on the association stored in the ontology between the one or more key words and the business rule, the computer automatically determining the other rule is the business rule, without a manual classification of the other rule by a human expert.

5. The method of claim 1, further comprising the steps of:

in response to the step of searching the first rule, the computer determining the second key word which indicates part of the business transaction with the customer of the business using the computer program is included in the first rule;

the computer determining a second rule includes the second key word which indicates part of the business transaction with the customer of the business using the computer program; and based on the second rule including the second key word, the computer determining the second rule is the business rule.

6. The method of claim 5, wherein the step of determining the second rule includes the second key word includes determining the second rule includes a key word which is a name of a first data element that indicates a constraint on a selection, a relationship, or a structure of a second data element, the constraint supporting an objective of the business.

7. The method of claim 5, wherein the step of determining the second rule includes the second key word includes determining the second rule includes a key word indicating an initiation of a calculation supporting an objective of the business.

8. The method of claim 1, wherein the step of determining whether the first rule includes the first key word which indicates the underlying operation includes determining the first rule includes the first key word, which indicates a check that a statement in the program is successfully executed or a check that the program was abnormally terminated, wherein the step of determining the first rule is the non-business rule is based in part on the first rule including the first key word indicating the check that the statement in the program is successfully executed or the check that the program was abnormally terminated.

9. A computer program product for distinguishing a business rule from a non-business rule in a computer program, the computer program product comprising:

one or more computer-readable storage devices and program instructions stored on the one or more storage devices, the one or more computer-readable storage devices not being one or more signals or signal propagation media, the program instructions comprising:

program instructions to identify a first rule in the computer program based on a conditional statement within the first rule;

program instructions to determine whether the first rule performs an underlying operation of the program, the underlying operation being independent of a business function of the program, by determining whether the first rule includes a first key word which indicates the underlying operation, which is a housekeeping process, exception handling, error checking, data validation, parameter cleanup, a reservation of computer memory, or a buffer setup;

program instructions to determine whether a sequence of program steps in the first rule matches a predetermined sequence of program steps indicative of the underlying operation of the program independent of the business function of the program;

program instructions to, if the first rule includes the first key word or the sequence of program steps in the first rule matches the predetermined sequence of steps indicative of the underlying operation of the program independent of the business function of the program, determine the first rule is a non-business rule, or if the first rule does not include the first key word and no sequence of program steps in the first rule matches the predetermined sequence of program steps indicative of the underlying operation of the program independent of the business function of the program:

program instructions to search the first rule and metadata of the first rule for a second key word which indicates part of a business transaction with a customer of a business using the computer program;

program instructions to determine whether a sequence of program steps in the first rule matches a predetermined sequence of program steps indicative of a business rule; and program instructions to, if the first rule includes the second key word, the metadata of the first rule includes the second key word, or the sequence of program steps in the first rule matches the predetermined sequence of program steps indicative of the business rule, determine the first rule is the business rule, or if the first rule and the metadata of the first rule do not include the second key word and no sequence of program steps in the first rule matches the predetermined sequence of program steps indicative of the business rule, determine the first rule is not classifiable as the business rule or the non-business rule;

program instructions to receive a first set of one or more semantic tags specifying a first candidate business rule in the computer program, the first candidate business rule being initially not classifiable as a first actual business rule or a first actual non-business rule;

program instructions to, based on the first set of one or more semantic tags, determine the first candidate business rule is specified by a pattern expressed in a context-free grammar for a programming language of the computer program, the pattern specifying a code structure included in the first candidate business rule, the pattern being included in a class of an ontology, and the class identifying a concept of the programming language;

program instructions to determine that a confidence level of the pattern is less than a first threshold, the confidence level indicating how likely the first candidate business rule is the first actual business rule, and the ontology associating the pattern with the confidence level;

program instructions to, based on the confidence level being less than the first threshold, determine a lack of confidence in the first candidate business rule being the first actual business rule;

program instructions to receive other sets of one or more semantic tags specifying other candidate business rules, each of the other sets of one or more semantic tags being identical to the first set of one or more semantic tags, and each of the other candidate business rules being not classifiable as an actual business rule or an actual non-business rule;

program instructions to, based on the other sets of one or more semantic tags being identical to the first set of one or more semantic tags, determine the other candidate business rules are specified by the pattern that also specifies the first candidate business rule;

program instructions to, based on the other candidate business rules being specified by the pattern that also specifies the first candidate business rule, determine that the other candidate business rules include the code structure specified by the pattern;

program instructions to determine a count of candidate business rules among the first candidate business rule and the other candidate business rules that include the code structure specified by the pattern;

program instructions to determine that the count of the candidate business rules exceeds a second threshold;

program instructions to, based on the count of the candidate business rules exceeding the second threshold, increase the confidence level of the pattern which indicates an increase in a likelihood that the candidate business rules are actual business rules;

program instructions to update the ontology to associate the pattern with the increased confidence level;

program instructions to determine the increased confidence level of the pattern is greater than the first threshold;

program instructions to, subsequent to the step of determining the increased confidence level is greater than the first threshold, receive a second set of one or more semantic tags specifying a second candidate business rule in the computer program or in another computer program;

program instructions to determine that the second candidate business rule includes the code structure specified by the pattern and determine that the second set of one or more semantic tags matches the first set of one or more semantic tags; and program instructions to, based on the second candidate business rule including the code structure specified by the pattern, the second set of one or more semantic tags matching the first set of one or more semantic tags, and the updated ontology associating the pattern with the increased confidence level, automatically determine that the second candidate business rule is a second actual business rule, without a manual classification of the second candidate business rule as the second actual business rule by a human expert; and program instructions to display the second candidate business rule as the second actual business rule.

10. The computer program product of claim 9, further comprising:

program instructions, stored on at least one of the one or more storage devices, to receive, subsequent to an execution of the program instructions to determine the first rule is not classifiable as the business rule or the non-business rule, manual classifications of the first rule and one or more other rules in the computer program or in other computer program(s) as the business rule;

program instructions, stored on at least one of the one or more storage devices, to receive a pattern of semantic tags specifying the first rule and each of the one or more other rules;

program instructions, stored on at least one of the one or more storage devices, to determine a count of the received manual classifications exceeds a predetermined threshold;

program instructions, stored on at least one of the one or more storage devices, to update, based on the count exceeding the threshold and the pattern of semantic tags specifying the first rule and each of the one or more other rules, an ontology to include an association between the pattern of semantic tags and the business rule;

program instructions, stored on at least one of the one or more storage devices, to identify, subsequent to an update of the ontology by an execution of the program instructions to update, a second rule in the computer program or in another computer program based on a conditional statement within the second rule;

program instructions, stored on at least one of the one or more storage devices, to determine the pattern of semantic tags included in the ontology specifies the second rule; and program instructions, stored on at least one of the one or more storage devices, to automatically determine, based on (1) the ontology including the association between the pattern of semantic tags and the business rule and (2) the pattern of semantic tags specifying the second rule, the second rule is the business rule.

11. The computer program product of claim 9, further comprising:

program instructions, stored on at least one of the one or more storage devices, to determine, for each time a sequence of program steps included in a second rule occurs in multiple computer programs, the sequence of program steps included in the second rule includes a conditional statement but does not match a predetermined sequence of program steps indicative of the business rule, does not match a predetermined sequence of program steps indicative of an underlying operation of a program included in the multiple programs independent of a business function of the program included in the multiple programs, does not include a key word indicative of the business rule, and does not include a key word indicative of the underlying operation of the program included in the multiple programs independent of the business function of the program included in the multiple programs;

program instructions, stored on at least one of the one or more storage devices, to determine a number of times the sequence of program steps in the second rule occurs in the multiple computer programs and determine the number exceeds a predetermined threshold;

program instructions, stored on at least one of the one or more storage devices, to change, based on the number exceeding the threshold, a classification of the second rule from being unclassifiable as the business rule or as a rule that is not any business rule to being classified as the rule that is not any business rule;

program instructions, stored on at least one of the one or more storage devices, to identify, subsequent to a change of the classification by an execution of the program instructions to change, the second rule in another computer program; and program instructions, stored on at least one of the one or more storage devices, to automatically determine, based on the changed classification, the identified second rule is the rule that is not any business rule.

12. The computer program product of claim 9, further comprising:

program instructions, stored on at least one of the one or more storage devices, to determine, for multiple occurrences of a second rule in the computer program, the second rule includes a conditional statement but does not match a predetermined sequence of program steps indicative of the business rule, does not match a predetermined sequence of program steps indicative of the underlying operation of the program independent of the business function of the program, does not include a key word indicative of the business rule, and does not include a key word indicative of the underlying operation of the program independent of the business function of the program;

program instructions, stored on at least one of the one or more storage devices, to send, for each of the multiple occurrences, the second rule to one or more human experts;

program instructions, stored on at least one of the one or more storage devices, to receive classifications from the one or more human experts of the second rule as the business rule;

program instructions, stored on at least one of the one or more storage devices, to determine a count of how many occurrences are included in the multiple occurrences and determine the count exceeds a predetermined threshold;

program instructions, stored on at least one of the one or more storage devices, to update, based on the count exceeding the threshold, an ontology by storing an association between the business rule and one or more key words included in the second rule or in metadata of the second rule;

program instructions, stored on at least one of the one or more storage devices, to identify another rule that includes the one or more key words or whose metadata includes the one or more key words; and program instructions, stored on at least one of the one or more storage devices, to automatically determine, based on the association stored in the ontology between the one or more key words and the business rule, the other rule is the business rule, without a manual classification of the other rule by a human expert.

13. A computer system for distinguishing a business rule from a non-business rule in a computer program, the computer system comprising:

one or more processors;
one or more computer-readable memories;
one or more computer-readable storage devices; and
program instructions stored on the one or more storage devices for execution by the one or more processors via the one or more memories, the program instructions comprising:

first program instructions to identify a first rule in the computer program based on a conditional statement within the first rule;

second program instructions to determine whether the first rule performs an underlying operation of the program, the underlying operation being independent of a business function of the program, by determining whether the first rule includes a first key word which indicates the underlying operation, which is a housekeeping process, exception handling, error checking, data validation, parameter cleanup, a reservation of computer memory, or a buffer setup;

third program instructions to determine whether a sequence of program steps in the first rule matches a predetermined sequence of program steps indicative of the underlying operation of the program independent of the business function of the program;

fourth program instructions to, if the first rule includes the first key word or the sequence of program steps in the first rule matches the predetermined sequence of steps indicative of the underlying operation of the program independent of the business function of the program, determine the first rule is a non-business rule, or if the first rule does not include the first key word and no sequence of program steps in the first rule matches the predetermined sequence of program steps indicative of the underlying operation of the program independent of the business function of the program:
search the first rule and metadata of the first rule for a second key word which indicates part of a business transaction with a customer of a business using the computer program;
determine whether a sequence of program steps in the first rule matches a predetermined sequence of program steps indicative of a business rule; and
if the first rule includes the second key word, the metadata of the first rule includes the second key word, or the sequence of program steps in the first rule matches the predetermined sequence of program steps indicative of the business rule, determine the first rule is the business rule, or if the first rule and the metadata of the first rule do not include the second key word and no sequence of program steps in the first rule matches the predetermined sequence of program steps indicative of the business rule, determine the first rule is not classifiable as the business rule or the non-business rule;
sixth program instructions to receive a first set of one or more semantic tags specifying a first candidate business rule in the computer program, the first candidate business rule being initially not classifiable as a first actual business rule or a first actual non-business rule;
seventh program instructions to, based on the first set of one or more semantic tags, determine the first candidate business rule is specified by a pattern expressed in a context-free grammar for a programming language of the computer program, the pattern specifying a code structure included in the first candidate business rule, the pattern being included in a class of an ontology, and the class identifying a concept of the programming language;
eighth program instructions to determine that a confidence level of the pattern is less than a first threshold, the confidence level indicating how likely the first candidate business rule is the first actual business rule, and the ontology associating the pattern with the confidence level;
ninth program instructions to, based on the confidence level being less than the first threshold, determine a lack of confidence in the first candidate business rule being the first actual business rule;
tenth program instructions to receive other sets of one or more semantic tags specifying other candidate business rules, each of the other sets of one or more semantic tags being identical to the first set of one or more semantic tags, and each of the other candidate business rules being not classifiable as an actual business rule or an actual non-business rule;
eleventh program instructions to, based on the other sets of one or more semantic tags being identical to the first set of one or more semantic tags, determine the other candidate business rules are specified by the pattern that also specifies the first candidate business rule;
twelfth program instructions to, based on the other candidate business rules being specified by the pattern that also specifies the first candidate business rule, determine that the other candidate business rules include the code structure specified by the pattern;
thirteenth program instructions to determine a count of candidate business rules among the first candidate business rule and the other candidate business rules that include the code structure specified by the pattern;
fourteenth program instructions to determine that the count of the candidate business rules exceeds a second threshold;
fifteenth program instructions to, based on the count of the candidate business rules exceeding the second threshold, increase the confidence level of the pattern which indicates an increase in a likelihood that the candidate business rules are actual business rules;
sixteenth program instructions to update the ontology to associate the pattern with the increased confidence level;
seventeenth program instructions to determine the increased confidence level of the pattern is greater than the first threshold;
eighteenth program instructions to, subsequent to the step of determining the increased confidence level is greater than the first threshold, receive a second set of one or more semantic tags specifying a second candidate business rule in the computer program or in another computer program;
nineteenth program instructions to determine that the second candidate business rule includes the code structure specified by the pattern and determine that the second set of one or more semantic tags matches the first set of one or more semantic tags; and
twentieth program instructions to, based on the second candidate business rule including the code structure specified by the pattern, the second set of one or more semantic tags matching the first set of one or more semantic tags, and the updated ontology associating the pattern with the increased confidence level, automatically determine that the second candidate business rule is a second actual business rule and display the second candidate business rule as the second actual business rule, without a manual classification of the second candidate business rule as the second actual business rule by a human expert.

14. The computer system of claim 13, further comprising:
twenty-first program instructions, stored on at least one of the one or more storage devices for execution by at least one of the one or more processors via at least one of the one or more memories, to receive, subsequent to an execution of the fourth program instructions to determine the first rule is not classifiable as the business rule or the non-business rule, manual classifications of the first rule and one or more other rules in the computer program or in other computer program(s) as the business rule;
twenty-second program instructions, stored on at least one of the one or more storage devices for execution by at least one of the one or more processors via at least one of the one or more memories, to receive a pattern of semantic tags specifying the first rule and each of the one or more other rules;
twenty-third program instructions, stored on at least one of the one or more storage devices for execution by at least one of the one or more processors via at least one of the one or more memories, to determine a count of the received manual classifications exceeds a predetermined threshold;

twenty-fourth program instructions, stored on at least one of the one or more storage devices for execution by at least one of the one or more processors via at least one of the one or more memories, to update, based on the count exceeding the threshold and the pattern of semantic tags specifying the first rule and each of the one or more other rules, an ontology to include an association between the pattern of semantic tags and the business rule;

twenty-fifth program instructions, stored on at least one of the one or more storage devices for execution by at least one of the one or more processors via at least one of the one or more memories, to identify, subsequent to an update of the ontology by an execution of the twenty-fourth program instructions to update, a second rule in the computer program or in another computer program based on a conditional statement within the second rule;

twenty-sixth program instructions, stored on at least one of the one or more storage devices for execution by at least one of the one or more processors via at least one of the one or more memories, to determine the pattern of semantic tags included in the ontology specifies the second rule; and twenty-seventh program instructions, stored on at least one of the one or more storage devices for execution by at least one of the one or more processors via at least one of the one or more memories, to automatically determine, based on (1) the ontology including the association between the pattern of semantic tags and the business rule and (2) the pattern of semantic tags specifying the second rule, the second rule is the business rule.

15. The computer system of claim 13, further comprising:

twenty-first program instructions, stored on at least one of the one or more storage devices for execution by at least one of the one or more processors via at least one of the one or more memories, to determine, for each time a sequence of program steps included in a second rule occurs in multiple computer programs, the sequence of program steps includes a conditional statement but does not match a predetermined sequence of program steps indicative of the business rule, does not match a predetermined sequence of program steps indicative of underlying operation of a program included in the multiple programs independent of a business function of the program included in the multiple programs, does not include a key word indicative of the business rule, and does not include a key word indicative of underlying operation of the program included in the multiple programs independent of the business function of the program included in the multiple programs;

twenty-second program instructions, stored on at least one of the one or more storage devices for execution by at least one of the one or more processors via at least one of the one or more memories, to determine a number of times the sequence of program steps in the second rule occurs in the multiple computer programs and determine the number exceeds a predetermined threshold;

twenty-third program instructions, stored on at least one of the one or more storage devices for execution by at least one of the one or more processors via at least one of the one or more memories, to change, based on the number exceeding the threshold, a classification of the second rule from being unclassifiable as the business rule or as a rule that is not any business rule to being classified as the rule that is not any business rule;

twenty-fourth program instructions, stored on at least one of the one or more storage devices for execution by at least one of the one or more processors via at least one of the one or more memories, to identify, subsequent to a change of the classification by an execution of the twenty-third program instructions to change, the second rule in another computer program; and twenty-fifth program instructions, stored on at least one of the one or more storage devices for execution by at least one of the one or more processors via at least one of the one or more memories, to automatically determine, based on the changed classification, the identified second rule is the rule that is not any business rule.

16. The computer system of claim 13, further comprising:

twenty-first program instructions, stored on at least one of the one or more storage devices for execution by at least one of the one or more processors via at least one of the one or more memories, to determine, for multiple occurrences of a second rule in the computer program, the second rule includes a conditional statement but does not match a predetermined sequence of program steps indicative of the business rule, does not match a predetermined sequence of program steps indicative of underlying operation of the program independent of a business function of the program, does not include a key word indicative of the business rule, and does not include a key word indicative of underlying operation of the program independent of the business function of the program;

twenty-second program instructions, stored on at least one of the one or more storage devices for execution by at least one of the one or more processors via at least one of the one or more memories, to send, for each of the multiple occurrences, the second rule to one or more human experts;

twenty-third program instructions, stored on at least one of the one or more storage devices for execution by at least one of the one or more processors via at least one of the one or more memories, to receive classifications from the one or more human experts of the second rule as the business rule;

twenty-fourth program instructions, stored on at least one of the one or more storage devices for execution by at least one of the one or more processors via at least one of the one or more memories, to determine a count of how many occurrences are included in the multiple occurrences and determine the count exceeds a predetermined threshold;

twenty-fifth program instructions, stored on at least one of the one or more storage devices for execution by at least one of the one or more processors via at least one of the one or more memories, to update, based on the count exceeding the threshold, an ontology by storing an association between the business rule and one or more key words included in the second rule or in metadata of the second rule;

twenty-sixth program instructions, stored on at least one of the one or more storage devices for execution by at least one of the one or more processors via at least one of the one or more memories, to identify another rule that includes or whose metadata includes the one or more key words; and twenty-seventh program instructions, stored on at least one of the one or more storage devices for execution by at least one of the one or more processors via at least one of the one or more memories, to automatically determine, based on the association stored in the ontology between the one or more key words and the business rule, the other rule is the business rule, without a manual classification of the other rule by a human expert.

* * * * *